Oct. 8, 1957          H. F. BOHL          2,808,905
                    SPEED GOVERNOR
Filed Oct. 21, 1950                    2 Sheets-Sheet 1

INVENTOR
Hermann F. Bohl

Oct. 8, 1957        H. F. BOHL        2,808,905
SPEED GOVERNOR
Filed Oct. 21, 1950              2 Sheets-Sheet 2
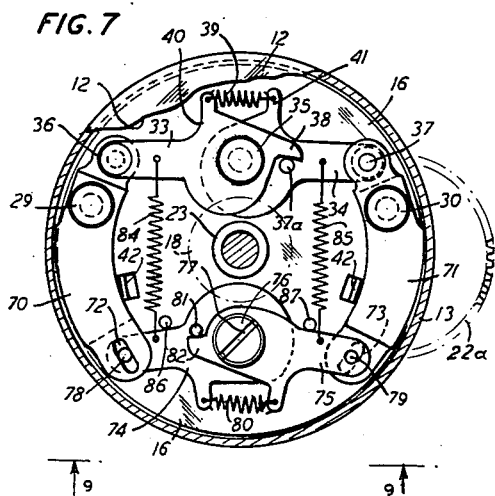
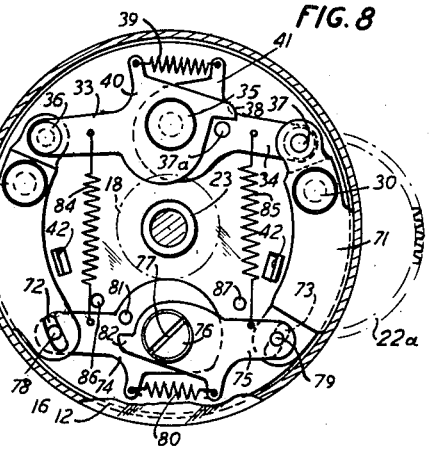
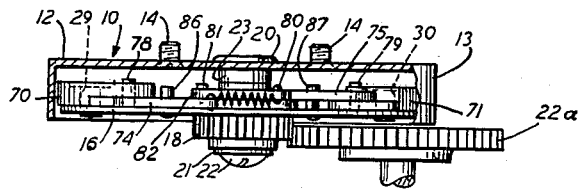
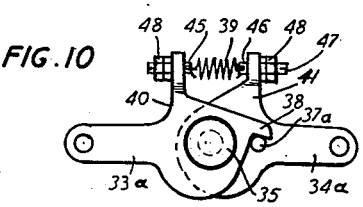
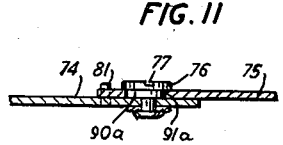
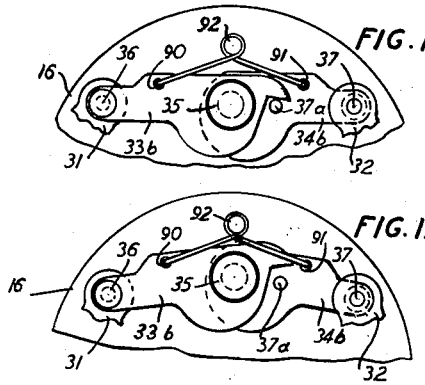
INVENTOR
Hermann F. Bohl United States Patent Office 2,808,905
Patented Oct. 8, 1957

2,808,905
SPEED GOVERNOR

Hermann F. Bohl, Fort Lee, N. J.; Elfriede Bohl, executrix of said Hermann F. Bohl, deceased Application October 21, 1950, Serial No. 191,435

14 Claims. (Cl. 188—184)

This invention relates to a centrifugal speed governor, and more specifically to such a governor in which a rotating braking mechanism is operable to establish a frictional braking effect on a stationary braking surface in response to centrifugal force at a critical rotational speed of the braking mechanism.

In centrifugal speed governors utilized heretofore, it was found that a frictional braking effect was established in response to centrifugal force, at rotational speeds below the critical speed at which it was desired that such braking effect should become initially established. This was due to the fact that the brake shoes were not positively locked in the unoperated position at speeds below the critical one. As a consequence, a certain amount of driving power tended to be wasted in overcoming the undesired frictional braking effect below the critical speed. This tended to result in both an uneconomical and ineffective operation of the speed governor, particularly in those speed governors involving the use of relatively small power magnitudes. Such wasted power is particularly undesirable in apparatus depending on hand-applied power such, for example, as in adding machines, comptometers and the like.

The present invention contemplates a centrifugal governor adapted to include brake shoes positively locked in a position disengaged from a suitable braking surface and maintained so disengaged irrespective of centrifugal force below a predetermined speed of the governor; and adapted further to unlock the brake shoes and thereby render them engageable with the braking surface in response to centrifugal force substantially at the predetermined speed of the governor.

It is an object of the present invention to positively lock braking shoes in the non-operative position below a predetermined speed.

It is another object to unlock brake shoes and thereby render them operative in response to centrifugal force substantially at a predetermined speed.

It is a further object to establish a braking effect on a split-second basis.

It is another object to obviate a waste of power, particularly in hand-operated apparatus.

It is another object to preclude a use of power to overcome an undesired braking effect.

It is still another object to operate a centrifugal speed governor on an economical and efficient basis.

In a specific embodiment, the invention, in conjunction with a stationary braking surface, comprises a rotatable mechanism engageable with such surface in response to centrifugal force substantially at a predetermined rotational speed of the mechanism. In the embodiment, the rotatable mechanism includes a disk rotatable adjacent the braking surface, a pair of brake shoes rotatable in opposite directions on the disk, a pair of levers having adjacent ends overlapping and pivoted together and having their opposite ends pivotally connected to corresponding ends of the braking shoes, and a coiled spring connected to the overlapping ends of the levers. The mechanism is so proportioned that the pivots of the levers with each other and with the brake shoes are disposed substantially in a straight line when the rotatable mechanism is at a state of rest or is rotating at less than a predetermined speed whereby the brake shoes are locked out of engagement with the braking surface and maintained so locked out. When the rotatable mechanism attains substantially the predetermined speed, centrifugal force projects the pivot of the overlapping lever ends out of the aforementioned pivotal straightline and into a radial direction relative to the rotating disk whereby the brake shoes are initially moved out of the locked position, and thereupon rendered engageable with the braking surface.

A feature resides in the rotatable mechanism whereby the brake shoes are caused to engage the stationary braking surface with different discrete frictional braking effects which are proportional to the speed of the rotatable mechanism.

Another feature resides in a rotating disk carrying a member engageable with a braking surface and controlled by spring means including a pair of levers having overlapping ends provided with a common pivot constituting a portion disposable in different radial directions relative to the rotating disk such that in one radial position the portion functions to lock the member disengaged from the braking surface for disk speeds below a predetermined amount and such that in another radial position the portion functions to unlock the member and thereby render it engageable with the braking surface.

Another feature concerns the braking means controlled by toggle means comprising a pair of levers having overlapping adjacent ends provided with a pivot, the lever toggle means being disposed substantially in a straightline to withhold the braking means from a braking surface for speeds less than a predetermined amount, the lever toggle means being disposed substantially in an elbow-like joint in response to centrifugal force for speeds substantially at predetermined speed to engage the braking means with the braking surface.

A further feature involves a pair of brake shoes having individual pivots, and a pair of levers having overlapping adjacent ends provided with a common pivot and having their opposite ends pivoted to corresponding ends of the brake shoes, the levers having their common pivot disposed such distance from the brake shoe pivots that the levers are disposed in a straightline to disengage the brake shoes from a suitable braking surface, the levers being actuable in response to centrifugal force approximately at a predetermined rotating speed to dispose their common pivot a different distance from the brake shoe pivots whereby the levers are disposed at an elbow-like angle to render the brake shoes engageable with the braking surface.

A modification contemplates, in conjunction with the above-described first-pair of levers having overlapping adjacent ends provided with a common pivot, a second pair of similar spring-controlled levers having overlapping adjacent ends provided with a common pivot and having their corresponding ends connected to the brake shoes. The two pairs of levers cooperate to actuate the brake shoes into engagement with the braking surface. The second pair of levers includes an eccentric pivot whereby the overall lever length is adjustable to substantially lock the brake shoes onto the braking surface.

A further modification contemplates a rotating disk, a pair of brake shoes disposed with a space intermediate adjacent ends thereof, a plunger having different diameters and movable in radial directions, the plunger having its portion of larger diameter movable into the space between the brake shoe ends to withhold the brake shoes from engagement with the braking surface in response to a disk speed below a predetermined amount, the plunger having its portion of smaller diameter movable into the space between the brake shoe ends in response to centrifugal force at the predetermined speed whereby the brake shoes are engaged with the braking surface.

The invention will be readily understood from the following description when taken together with the accompanying drawing in which:

Fig. 7 is a plan view of another modification of the invention of Figs. 1 through 3 shown in the non-operated position with a cover partially removed;

Fig. 8 is identical with Fig. 7 except the modification is shown in operated position;

Fig. 9 is a cross-sectional view taken along line 9—9 in Fig. 7;

Fig. 10 is a fragmentary elevational view of an element in Figs. 7, 8 and 9;

Fig. 11 is a plan view of an element usable in Figs. 7 through 9; and

Figs. 12 and 13 are plan views of a lever arrangement usable in Figs. 1, 2, 3, 7, 8 and 9.

The same elements appearing in the several figures of the drawing are identified by the same reference numerals.

Figure 1:
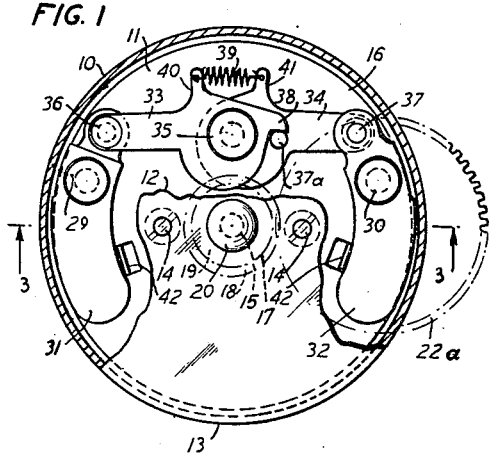
Fig. 1 is a plan view of a specific embodiment of the invention in the non-operated position, with a cover partially removed.
Figure 2:
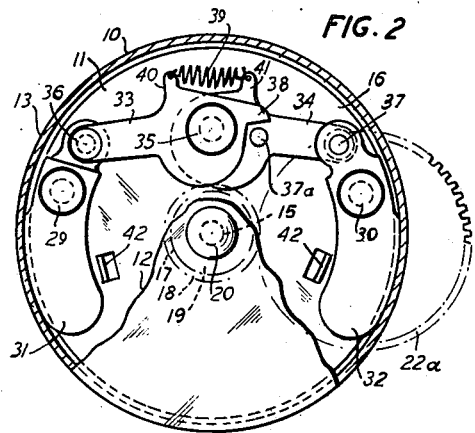
Fig. 2 is identical with Fig. 1 except the specific embodiment is shown in the operated position.
Figure 3:
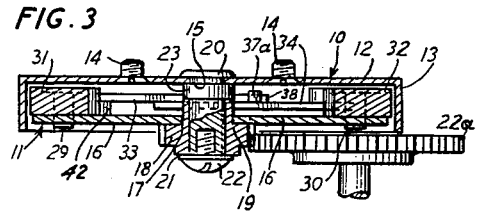
Fig. 3 is a cross-sectional view taken along line 3—3 in Fig. 1.

As shown in Figs. 1, 2 and 3, a centrifugal speed governor in accordance with a specific embodiment of the invention comprises essentially a fixed braking surface 10 and a braking mechanism 11 rotatable in proximity of braking surface 10 and responsive to centrifugal force substantially at a predetermined rotational speed to engage braking surface 10 and thereby establish a frictional braking effect thereon in a manner that will be presently explained. The speed governor also tends to establish different discrete frictional braking effects which are proportional to the rotational speed of braking mechanism 11.

Braking surface 10 comprises a wafer-type disk 12 whose periphery is formed with an integral annular rim 13 projecting normally to a side surface thereof and having an inner smooth area adapted to constitute a curvilinear braking surface. The latter surface is intermittently engageable with a rotatable braking mechanism 11 to establish frictional braking effects in the manner which will be pointed out hereinafter. A pair of screws 14, 14 serves to mount braking surface 10 in a fixed position. The disk 12 includes an axial opening 15 for a purpose that will presently appear. Thus, the disk 12 and annular rim 13 constitute effectively a stationary cup-shaped braking surface.

Braking mechanism 11 in Fig. 3 comprises a wafer-type disk 16 proportioned in one plane substantially coextensively with disk 12 and including an axial opening 17 which is coaxial with the opening 15 of disk 12. A pinion gear 18 has an integral collar 19 pressed securely into the wall of opening 17 to constitute effectively a unitary structure. A shaft 20 has one end disposed in axial opening 15 of disk 12 and rigidly attached thereto; and its opposite end adapted to rotatably support the unitary structure comprising the disk 16 and pinion gear 18. A washer 21 and screw 22 maintain the unitary structure on the fixed shaft 20. A gear 22a meshing with pinion gear 18 and coupled to a suitable power source, not shown, serves to rotate the unitary disk 16 and pinion gear 18 on the fixed shaft 20 for a purpose that will appear later. A collar 23 attached fixedly to shaft 20 intermediate disks 12 and 16 provides an axial surface against which integral collar 19 is rotated; and at the same time serves an additional purpose which will be subsequent identified.

As shown in Figs. 1 and 2, the reverse side of disk 16 includes a pair of spaced pivots 29 and 30 mounted normally to that side adjacent the periphery of the disk. A pair of curvilinear brake shoes 31 and 32 contain suitable openings which accommodate rotatably the pivots 29 and 30, respectively, whereon rotatable movements of the brake shoes are achieved, in a manner that will be pointed out hereinafter. In this connection, it will be understood that the portions of the respective brake shoes opposing corresponding portions of the internal area of annular rim 13 are formed with curvilinear surfaces complementary to the internal opposing portions of the annular rim 13. Frictional engagement between the brake shoes and braking surface is effected to provide a braking effect, in a manner that will be described below. It will be understood that the disk 16 may comprise any flat or plate-like member on which the brake shoes 31 and 32, levers 33 and 34, and spring 39 can be mounted.

Referring to Figs. 1 and 2, a pair of levers 33 and 34 have their adjacent ends overlapping and provided thereat with a common pivot 35, and have their opposite ends connected by pivots 36 and 37 to corresponding ends of brake shoes 31 and 32, respectively. An eccentric pin 37a disposed perpendicularly on a face of lever 34 engages a lip 38 formed integral on an adjacent end of lever 33. A coiled spring 39 has its opposite ends connected to integral projections 40 and 41 formed integrally and transversely of the overlapped ends of levers 33 and 34, respectively. A pair of stops 42, 42 comprising punched out tabs disposed normally to the reverse side of disk 16 serves to limit rotary movements of brake shoes 31 and 32 toward each other.

The operation of the centrifugal speed governor according to Figs. 1, 2 and 3 will now be explained. Initially, let it be assumed that gear 22a is at a state of rest to establish the centrifugal speed governor in the non-operated position whereat coiled spring 39 serves to hold the lip 38 of lever 33 in engagement with the eccentric pin 37a, and stops 42, 42 hold brake shoes 31 and 32 in an equalized position with reference to the annular rim 13. The eccentric pin 37a serves a purpose to be later mentioned. In this position, the axes of pivots 35, 36 and 37 are disposed substantially in a straight line. This serves to dispose levers 33 and 34 substantially in the same straight line whereby common pivot 35 locks brake shoes 31 and 32 in a position disengaged from the annular braking rim 13. Thus, the levers 33 and 34 including common pivot 35 constitute effectively a toggle means positioned substantially in a straight line when the centrifugal speed governor lies in the non-operated position. In the latter position, common pivot 35 is disposed a preselected distance from each of brake shoe pivots 29 and 30.

Next, let it be assumed that gear 22a is so driven that disk 16 is rotated at a speed which approaches but does not attain a predetermined amount. At such speed the governor is so proportioned that centrifugal force is ineffective to substantially disturb the non-operated position thereof illustrated in Fig. 1.

Finally, let it be assumed that gear 22a is so driven that disk 16 is rotated approximately at the predetermined speed. At such speed, the centrifugal governor is so proportioned that centrifugal force moves common pivot 35 in a radial direction toward the periphery of disk 16 and thereby out of the straight line relation with pivots 36 and 37, as shown in Fig. 2. As a consequence, levers 33 and 34 are rotated on their respective pivots to unlock brake shoes 31 and 32 and thereafter to rotate them on pivots 29 and 30, respectively, into frictional engagement with accommodating portions of annular braking rim 13. Now, the toggle means including levers 33 and 34 is disposed in an elbow-like joint with reference to their common pivot 35. This serves to move common pivot 35 an increased distance from the brake shoe pivots 29 and 30. The centrifugal force is, however, partially diminished by the counter-acting force of spring 39. Thus, the centrifugal governor is so proportioned as to respond to centrifugal force substantially on a split-second basis to cause braking shoes 31 and 32 to apply a preselected frictional braking effect to the annular rim 13.

As the speed of disk 16 tends to increase, centrifugal force tends to move common pivot 35 further in the radial direction toward the periphery of disk 16 to render smaller the angle between levers 33 and 34 formed in the above-mentioned elbow-like joint with reference to their common pivot 35. This tends to actuate brake shoes 31 and 32 into increased frictional engagement with the annular braking rim 13 but the frictional engagement is still partially diminished by the counteracting force of spring 39. Should such braking effect fail to reduce the rotating speed of disk 16, then the speed of disk 16 will continue to increase. As a consequence, the increased centrifugal force acting to move common pivot 35 still further in the radial direction will now tend to counterbalance substantially the force of spring 39 and thereby permit centrifugal force to actuate brake shoes 31 and 32 into increased engagement with annular rim 13. This will render still smaller the angle between levers 33 and 34 formed in the elbow-like joint. Now, the frictional braking effect exerted by brake shoes 31 and 32 will be proportional to the speed of disk 16.

As the braking effect might not yet control the rotating speed of disk 16, the speed will tend further to increase. This speed will result in an increase amount of centrifugal force acting on common pivot 35 to move the latter further in the radial direction. This will reduce still further the angle between levers 33 and 34 in the elbow-like joint. As a consequence, the centrifugal force will not only counterbalance the force of spring 39 but will also increase the frictional engagement of the brake shoes 31 and 32 on the annular rim 13 in proportion to the speed of disk 16. Now, the frictional engagement of brake shoes 31 and 32 on rim 13 will be augmented by the weight of levers 33 and 34 and their common pivot 35 acting through pivots 36 and 37 on brake shoes 31 and 32, respectively.

The tension of coiled spring 39 in Figs. 1 and 2 can be adjusted by the utilization, for example, of a structure according to Fig. 10. Referring to the latter, coiled spring 39 has its opposite ends fastened to opposing ends of a pair of threaded bolts 45 and 46 disposed in accommodating threaded openings provided in over-lapping ends 40 and 41 formed integrally on levers 33a and 34a, respectively, as above explained. Each of the opposite ends of the bolts has a screwdriver slot 47 formed therein for varying the positions of bolts 45 and 46 relative to each other; and a pair of nuts 48, 48. To achieve such tension adjustment the nuts 48, 48 are so loosened on the respective bolts 45 and 46 as to permit the positions of bolts 45 and 46 to be adjusted relative to each other via the screwdriver slots to establish the desired tension in the spring 39. Thereafter, the nuts 48, 48 are actuated into firm and fast engagement with the respective lever ends 40 and 41 whereby such amount of tension is maintained in the spring 39.

Figure 4:
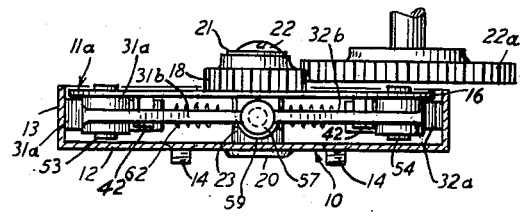
Fig. 4 is a cross-sectional view taken along the line 4—4 in Fig. 6.
Figure 5:
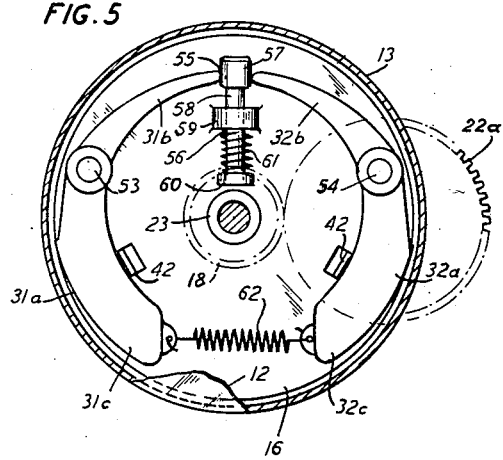
Fig. 5 is a plan view of a modification of the invention of Figs. 1 through 3 shown in the non-operated position, with a cover partially removed.
Figure 6:
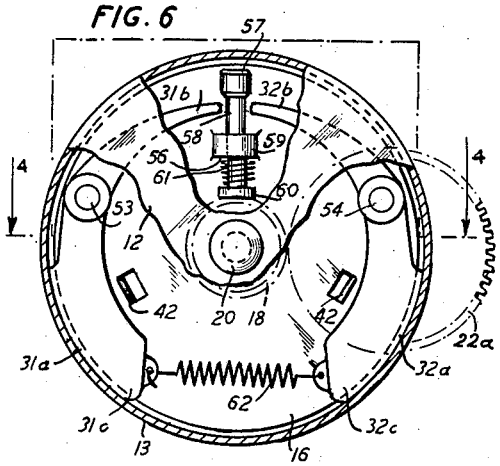
Fig. 6 is identical with Fig. 5 except the modification is shown in the operated position.

Figs. 4, 5 and 6 illustrate a modified centrifugal speed governor comprising the braking surface 10 including the annular braking rim 13, and a braking mechanism 11a rotatable in proximity of the rim 13 in a manner that will be presently explained. The mechanism 11a comprises the disk 16 adapted with the pinion gear 18 to constitute the unitary structure rotatable in proximity of the braking rim 13 as illustrated in Fig. 3 and hereinbefore described in connection therewith. The reverse side of disk 16 includes a pair of spaced pivots 53 and 54 mounted normally to that side adjacent the periphery of the disk. A pair of curvilinear brake shoes 31a and 32a contain suitable openings which accommodate rotatably the pivots 53 and 54, respectively, whereby rotatable movements of the brake shoes are achieved in a manner which will now be explained.

Corresponding ends 31b and 32b of the respective brake shoes 31a and 32a are disposed in opposing relation with a space 55 intervening therebetween as shown in Fig. 5. A plunger 56 includes on one end an enlarged head 57 disposed in the space 55 in engagement with the opposing ends 31b and 32b; and an elongated reduced portion 58 slidably mounted in a block 59 fixedly secured to the reverse side of disk 16. The opposite end of the reduced portion 58 is formed with an integral transverse plate 60. A compression spring 61 is positioned about the reduced portion 58 intermediate block 59 and plate 60. A coiled spring 62 connected to opposite ends 31c and 32c of brake shoes 31a and 32a, respectively, rotate the latter in opposite directions on their pivots to engage stops 42, 42. Thus, Fig. 5 shows the modified centrifugal speed governor disposed in the non-operated position due to the fact that the gear 22a in Fig. 4 is at a state of rest. In this state, the spring 61 maintains the enlarged head 57 intermediate the brake shoe ends 31b and 32b whereby the brake shoes 31a and 32a are witheld from engagement with the braking rim 13. The operation of this regulator will now be explained.

Assuming now the gear 22a is so driven that the disk 16 in Fig. 4 is rotated at a speed which approaches but does not attain a predetermined amount. At such speed, the modified governor is so proportioned that centrifugal force is ineffective to substantially disturb the non-operated position thereof illustrated in Fig. 5.

Assuming next the gear 22a is so driven that the disk 16 is rotated approximately at the predetermined speed. At such speed, centrifugal force tends to compress spring 61 and thereby cause plunger 56 to move in a radial direction toward the periphery of disk 16 as shown in Fig. 6. This results in a projection of the plunger reduced portion 58 into the space 55 intermediate brake shoe ends 31b and 32b and in an extension of spring 62 whereby brake shoes 31a and 32a are actuated into frictional engagement with accommodating sections of the annular braking rim 13. As the speed of disk 16 rises above the predetermined amount, the brake shoes 31a and 32a are actuated with a proportional increase in the frictional braking effect.

In Figs. 4, 5 and 6, it will be understood that a spring-controlled latch means, not shown, can be substituted for the spring arrangement including plunger 35 for the purpose of controlling brake shoes 31a and 32a in response to centrifugal force due to the speed of disk 16.

Figs. 7, 8, 9 and 10 delineate a further modified centrifugal speed governor which is a modification of the one shown in Figs. 1, 2 and 3 and described hereinbefore. Referring to Figs. 7, 8 and 9, the further governor comprises, as shown in Figs. 1, 2 and 3, the fixed braking surface 10 including the disk 12 and integral annular rim 13; and the rotatable disk 16, brake shoe pivots 29 and 30, levers 33 and 34 having common pivot 35 at the overlapped ends thereof and the opposite end pivots 36 and 37, eccentric pin 37a, lip 38, coiled spring 39 connected to the integral lever projections 40 and 41, and lever stops 42, 42.

The further modified governor in Figs. 7, 8 and 9 includes brake shoes 70 and 71 provided with suitable openings for rotatably accommodating pivots 29 and 30 and 36 and 37, respectively, and formed with curvilinear portions to engage the accommodating interior sections of the annular braking rim 13. At the lowermost ends of the respective brake shoes, elongated slots 72 and 73 extend substantially longitudinally thereof. Positioned between these brake shoes is a second pair of levers 74 and 75 having adjacent overlapped ends provided with an eccentric pivot 76 formed with a screw driver slot 77. Pins 78 and 79 projecting transversely from corresponding sides of levers 74 and 75, respectively, are accommodated for slidable movement in the slots 72 and 73, respectively. A coiled spring 80 is connected to the overlapped ends of levers 74 and 75. A transverse pin 81 on lever 74 is adapted to engage lip 82 on lever 75 for limiting rotary movements of the latter for a purpose that will later appear. Coiled springs 84 and 85 are connected to levers 33 and 74 and 34 and 75, respectively. Transverse pins 86 and 87 on disk 16 limit movement of levers 74 and 75, respectively, toward the levers 33 and 34 in response to the effect of springs 84 and 85.

The operation of the further modified centrifugal speed governor according to Figs. 7, 8 and 9 is as follows: Firstly, it will be understood that levers 33 and 34 function to actuate brake shoes 70 and 71 in Figs. 7, 8 and 9 exactly in the manner those levers function to actuate brake shoes 31 and 32 in the centrifugal speed governor according to Figs. 1, 2 and 3 as hereinbefore described. Assuming initially the further speed governor of Figs. 7, 8 and 9 to be in the non-operated condition due either to the governor lying in the state of rest or the rotation of disk 16 at a speed below the predetermined amount, then coiled spring 80 tends to maintain lip 82 of lever 74 against stop pin 81, and coiled spring 84 and 85 tend to maintain levers 74 and 75 against stop pins 86 and 87, respectively, as illustrated in Fig. 7. As a consequence, brake shoes 70 and 71 are entirely disengaged from braking rim 13.

When, however, disk 16 tends to attain a rotary speed approximating the predetermined amount, centrifugal force moves common pivot 35 in a radial direction toward the periphery of disk 16 whereby brake shoes 70 and 71 are un-locked and thereafter actuated into engagement with the annular braking rim 13 substantially in the manner of the actuation of brake shoes 31 and 32 according to the centrifugal speed governor in Figs. 1, 2 and 3. Simultaneously, with the foregoing, the eccentric pivot 76 will also tend to move in a radial direction toward the periphery of disk 16, but in a radial direction opposite to that of the radial movement of common pivot 35 and out of contact with stop pins 86 and 87. This will tend to cause transverse pins 78 and 79 on levers 74 and 75 to firmly engage with or wedge against the respective sides of slots 72 and 73 and thereby tend to increase the effect of brake shoes 31 and 32. This therefore tends to supplement the aforementioned action of levers 33 and 34 on brake shoes 70 and 71. As the rotational speed of disk 16 tends to exceed the predetermined amount, the eccentric pivot 76 will tend to move further in the radial direction toward the periphery of disk 16 and thereby will tend to increase in proportion the frictional effect of brake shoes 70 and 71 on braking rim 13.

In Fig. 11, adjustment of the rotational position of eccentric pivot 76 via screwdriver slot 77 will increase or decrease the effective overall length of levers 74 and 75 and thereby will tend to increase or decrease the force exerted by levers 74 and 75 on braking rim 13. Referring to Fig. 11, it will be seen that eccentric pivot 76 includes an integral collar portion 90a positioned eccentrically along an axis of the pivot and disposed in opening 91a provided in the overlapped end of lever 75. As pivot 76 is rotated via its screwdriver slot 77, the eccentric portion 90a moves the lever 75 away from or toward the axis of pivot 76 and thereby increases or decreases the effective overall length of levers 74 and 75. In this connection, it will be apparent that the effective length of the overall levers 74 and 75 may be so adjusted as to effectively lock brake shoes 70 and 71 on to the annular rim 13.

Figs. 12 and 13 show a lever arrangement which may be substituted for levers 33 and 34 in Figs. 1, 2, 3, 7, 8 and 9. Referring to Fig. 12, levers 33b and 34b are provided with apertures 90 and 91, respectively, which accommodate the free ends of an inverse spring 92 and which are disposed in a straightline parallel to the straightline including pivots 35, 36 and 37. In this position the spring 92 is proportioned to maintain the brake shoes 31 and 32 locked in the disengaged or inoperative position, Fig. 1, so long as the rotary speed of disk 16 is below the predetermined amount. As the rotary speed of disk 16 equals substantially the predetermined amount, common pivot 35 moves in a radial direction toward the periphery of disk 16 and, at the same time, the openings 90 and 91 move in a direction opposite to that of the movement of the common pivot 35 due to the fact that the levers 33b and 34b are now disposed in an elbow-like joint as shown in Fig. 13. Now, the brake shoes 31 and 32 are released and applied to the annular brake rim 13, Fig. 2, by centrifugal force whose effect is partially diminished by the force of spring 92.

As the speed of disk 16 tends to increase, centrifugal force will tend to move the common pivot 35 further in the radial direction to counter-balance the force of spring 92 whereby the full effect of centrifugal force will tend to increase the frictional contact between the brake shoes 31 and 32 on the annular rim 13. Assuming that the speed of disk 16 tends to increase, then centrifugal force will tend to move the common pivot 35 still further in the radial direction. This will not only bring about the counter-balance of the force of spring 92 as above noted but will, in addition, cause levers 33b and 34b together with common pivot 35 to supplement the centrifugal force due to the rotation of disk 16. As a consequence, the breaking effect of brake shoes 31 and 32 will be increased not only in proportion to centrifugal force due to the rotation of disk 16 but, in addition, because of the weight of levers 33b and 34b and common pivot 35 acting through pivots 36 and 37, as described above in connection with Figs. 1, 2 and 3. This will cause the speed of disk 16 to be so controlled as to remain at a certain amount or to be decreased, as desired. In the latter connection, it will be understood that spring 92 may be so proportioned as to maintain the brake shoes 31 and 32 in the operative position until disk 16 attains a speed below the predetermined amount at which the brake shoes 31 and 32 were initially released and applied to the annular rim 13. Thus, for example, spring 92 may be so proportioned as to unlock brake shoes 31 and 32 and thereafter to initially apply them to annular rim 13 at a predetermined speed of 1500 R. P. M. of disk 16 but to disengage brake shoes 31 and 32 from annular rim 13 at a speed of 500 R. P. M. of disk 16.

Referring now to Figs. 1, 2 and 3, the portion of eccentric pin 37a engaging lip 38 is so adjustable in position relative to lip 38 as to initially predispose levers 33 and 34 in such relative position on common pivot 35 that the predetermined speed of disk 16 may be expeditiously controlled. In other words, eccentric pin 37a may be utilized to control the predetermined speed of disk 16 at which the frictional braking effect becomes operative.

What is claimed is:

1. In a speed governor, a fixed stationary curvilinear braking surface, a braking mechanism engageable with and disengageable from said surface, comprising a member rotatable adjacent said surface and having an axis of rotation coincidental with an axis of said surface, a pair of brake shoes, a pair of pivots disposed in spaced relation along an edge of said member for movable supporting said brake shoes thereon, each of said pivots dividing one of said brake shoes into an oblong braking portion and an oblong non-braking portion, said portions having edges of longer dimensions positioned substantially coextensively with spaced portions of said edge of said rotatable member, and spring means comprising a coiled spring and engaging only said non-braking portions, said spring means being movably positioned in proximity of said member for controlling the rotation of said brake shoes and thereby the frictional engagement of said braking portions with said surface, said coiled spring being movable in a radial direction relative to said member axis of rotation for controlling the rotational direction of said braking shoes, said spring being positioned a preselected amount of distance in said radial direction and thereby being rendered effective to rotate said brake shoes in opposite directions on the respective pivots for locking said braking portions disengaged from said surface regardless of the centrifugal force effective at a member speed below a predetermined amount, said spring being moved an additional amount of radial distance relative to said preselected distance and thereby being rendered ineffective to further rotate said brake shoes on said pivots by the centrifugal force effective approximately at said predetermined rotational speed of said member, said last-mentioned centrifugal force then causing said brake shoes to rotate on said pivots in directions respectively opposite to said first-mentioned opposite directions thereby unlocking said braking portions and moving them into frictional engagement with said surface.

2. The speed governor according to claim 1 in which said member rotates at a speed greater than said predetermined speed, said spring is moved a further distance than said additional amount of distance by the centrifugal force effective at said greater predetermined speed, said last-mentioned centrifugal force then causes said brake shoes to rotate further in said last-mentioned opposite directions to move said braking portions into a proportionally increased frictional engagement with said surface.

3. In a speed governor, a fixed curvilinear braking surface, and braking means engageable with and disengageable from said surface, comprising means rotatable in proximity of said surface on an axis coincidental with an axis of said surface, a pair of brake shoes, a pair of pivots disposed adjacent an edge of said rotatable means for movably supporting said brake shoes thereon, each of said pivots dividing one of said brake shoes into an oblong braking portion and an oblong non-braking portion, said portions having edges of longer dimensions positioned in proximity of said edge of said rotatable means, and snap-action means comprising a pair of levers having pivoted overlapping ends and other ends pivotally connected to ends of said non-braking portions, whereas ends of said braking portions are free, and spring means extending across and connected to the overlapping ends of said levers, said spring means disposing said levers substantially in a straight line to lock said free ends of said braking portions out of engagement with said surface regardless of the centrifugal force effective at speeds of said rotatable means less than a predetermined amount, said spring means permitting said levers to break away at their pivoted overlapping ends with a snap action from said straight line disposition thereof and thereby to be disposed in an elbow-like joint to un-lock said free ends of said braking portions and thereafter to engage said last-mentioned free ends with said surface in response to centrifugal force effective substantially at said predetermined speed of said rotatable means.

4. In a speed governor, a fixed curvilinear braking surface, and means operable to engage or disengage said surface in response to centrifugal force, comprising a disk having a periphery complementary to said surface and rotatable in proximity thereof on an axis common with an axis of said surface, braking means having an edge substantially coincidental with said disk periphery, pivot means disposed adjacent said disk periphery and dividing said braking means into a plurality of oblong braking and non-braking portions, said portions being movably positioned adjacent said disk periphery and having edges of longer dimensions disposed substantially coincidentally therewith, and means on said disk for controlling movements of said braking means, said controlling means comprising a pair of levers having pivoted overlapping adjacent ends and pivotally connected at opposite ends to said non-braking portions, and tension means connected to said overlapping lever ends, said tension means aligning the lever pivots substantially in a straightline to lock said braking means in such position as to hold said braking portions disengaged from said surface regardless of centrifugal force effective below a predetermined rotational speed of said disk, said tension means permitting the pivoted overlapping lever ends to move out of said lever straightline alignment to unlock said braking means and thereby engage said braking portions with said braking surface in response to the centrifugal force effective substantially at said predetermined speed of said disk.

5. The speed governor according to claim 4 in which said tension means permits the pivoted overlapping lever ends to move further out of said lever straightline alignment and thereby to engage said braking portions with said braking surface with an increasing braking effect in response to increasingly effective centrifugal force as the rotational speed of said disk increases proportionally beyond the predetermined speed.

6. A speed governor comprising a fixed curvilinear braking surface, and means engageable with and disengageable from said surface, comprising curvilinear means rotatable adjacent said surface on an axis coincidental with an axis thereof, breaking means, pivot means disposed adjacent an edge of said rotatable means and rotatably supporting said braking means thereon, said pivot means dividing said last-mentioned means into oblong braking and non-braking portions, said portions having edges of longer dimensions substantially coinciding with said edge of said rotatable means, and toggle means including a coiled spring connected only to said non-braking portions for movably positioning said braking and non-braking portions in proximity of said edge of said rotatable means and thereby disposing said edges of longer dimensions substantially coincidental with said last-mentioned edge, said toggle means being disposed substantially in a straightline by said coiled spring tending to withhold said braking portions from engagement with said surface regardless of the centrifugal force effective at speeds of said rotatable means less than a predetermined amount, said toggle means being disposed substantially in an elbow-like joint regardless of the tendency of said coiled spring to withhold said braking portions from said surface and thereby engaging said braking portions with said surface in response to centrifugal force effective at a speed of said rotatable means substantially at said predetermined amount.

7. In a speed governor, a fixed curvilinear braking surface, and a curvilinear mechanism rotatable at different speeds adjacent said surface on an axis coincidental with an axis thereof for engagement with said surface and disengagement therefrom, comprising a pair of brake shoes, a pair of pivots positioned adjacent a periphery of said mechanism, each pivot dividing one brake shoe into an oblong braking portion and an oblong non-braking portion, said portions having edges of longer dimensions positioned in proximity of the periphery of said mechanism, and snap-action means comprising two members having a common pivot at adjacent ends and having opposite ends connected to said non-braking portions, said last-mentioned means actuating said non-braking portions to lock said braking portions disengaged from said surface irrespective of the centrifugal force effective below a predetermined speed of said mechanism, said last-mentioned means further actuating said non-braking portions to cause said members to break away from said common pivot with a snap action to unlock said braking portions and thereafter to frictionally engage said last-mentioned portions with said surface in response to the centrifugal force effective substantially at said predetermined speed of said mechanism.

8. In a speed governor, a fixed curvilinear braking surface, and a mechanism rotatable at different speeds in proximity of said surface on an axis common thereto for engagement with said surface and disengagement therefrom, comprising a pair of brake shoes, a pair of pivots disposed in spaced relation along a periphery of said mechanism for movably supporting said brake shoes in spaced relation thereon, each of said pivots dividing one of said brake shoes into an oblong braking portion and an oblong non-braking portion, said portions having edges of longer dimensions positioned in spaced relation substantially coincidentally with the periphery of said mechanism, a pair of levers having overlapping adjacent ends, a common pivot for said last-mentioned ends, said levers also having opposite ends connected pivotally only to corresponding ends of said non-braking portions, and tension means connected across said last-mentioned overlapping ends, said common pivot being disposed one distance from said first-mentioned pivots in response to said tension means to disengage said braking portions from said surface irrespective of centrifugal force effective below a predetermined rotatable speed of said mechanism, said last-mentioned disposition of said common pivot positioning said levers substantially at a right angle relative to the respective brake shoes, said common pivot being disposed a different distance from said first-mentioned pivots whereat said braking portions are engaged with said surface regardless of said tension means and in response to the centrifugal force effective substantially at said predetermined rotatable speed of said mechanism, said last-mentioned disposition of said common pivot positioning said levers at an elbow-like angle relative to the respective brake shoes.

9. In a speed governor, a stationary curvilinear braking surface, means rotatable in proximity of said surface on an axis coincidental with an axis of said surface, a pair of brake shoes, means for pivotally mounting said brake shoes in spade relation on an edge of said rotatable means so that adjacent brake ends lie substantially in opposing relation along said edge of said means, said pivot means dividing the respective brake shoes into a first oblong leg engageable with said surface and a second oblong leg non-engageable therewith, said legs having edges of longer dimensions positioned substantially along said edge of said rotatable means, and spring-controlled means connected only to said second legs, said last-mentioned means serving to actuate said brake shoes on their respective pivots and thereby to withhold said first legs from engagement with said surface irrespective of centrifugal force at different speeds of said rotatable means below a predetermined amount, said spring-controlled means being rendered ineffective to further actuate said brake shoes on their respective pivots by the centrifugal force effective substantially at and above said predetermined speed of said rotatable means, said last-mentioned centrifugal force causing the actuation of said brake shoes and thereby moving said first legs into increasing engagement with said braking surface in amounts corresponding to proportional increases in the speed of said rotatable means above said predetermined amount.

10. In a speed governor, a fixed circular braking surface, and a mechanism actuable into frictional engagement with said surface in response to centrifugal force effective at a predetermined rotary speed of said mechanism, comprising a disk rotatable adjacent said surface and having an axis of rotation coincidental with an axis of said surface, a pair of brake shoes, a pair of pivots positioned adjacent a periphery of said disk, each of said pivots dividing one of said brake shoes into an oblong braking portion and an oblong non-braking portion, said braking and non-braking portions having edges of longer dimensions substantially coinciding with said disk periphery, a pair of levers disposed in proximity of said disk and having adjacent ends overlapping and pivotally connected together, said levers also having their opposite ends pivotally connected only to corresponding ends of said non-braking portions, and spring means connected to said lever overlapping ends and tending to pull the respective levers in opposite rotational directions on the pivot at their overlapping ends, said spring means causing said levers to have their last-mentioned pivot disposed substantially in a straightline alignment with the pivots of said levers and non-braking portions whereby said braking portions are locked out of engagement with said surface for rotational speeds of said disk below the predetermined amount regardless of the centrifugal force effective thereat, said spring means permitting the pivot at the overlapping ends of said levers to be projected out of said straightline alignment in response to the centrifugal force effective substantially at said predetermined rotational speed of said disk whereby said braking portions are un-locked and then actuated into engagement with said surface.

11. In a mechanical brake, a fixed curvilinear braking surface, and means frictionally engageable with and disengageable from said surface in response to centrifugal force, comprising a curvilinear plate having a periphery complementary to said surface and having an axis of rotation coincidental with an axis of said surface whereby said plate is rotatable at different speeds adjacent said surface, braking means having an edge substantially coincidental with said plate periphery, pivot means disposed adjacent said plate periphery and dividing said braking means into a plurality of braking and non-braking portions, said portions being positioned in proximity of said plate periphery and movable thereabout on said pivot means, and snap-action means comprising a pair of levers having a common pivot at overlapping ends thereof, and a spring extending across said common pivot and connected to said levers, said levers having other ends pivotally connected to said non-braking portions, said snap-action means actuating said non-braking portions to lock said braking portions in positions disengaged from said surface regardless of the centrifugal force effective below a predetermined plate speed, said snap-action means breaking away said levers from said common pivot with a snap action and thereby actuating said non-braking portions to un-lock said braking portions and thereafter to frictionally engage said last-mentioned portions with said surface in response to the centrifugal force effective substantially at said predetermined plate speed.

12. The mechanical brake according to claim 11 in which said snap-action means breaks said levers further on said common pivot in directions from said plate axis of rotation and thereby actuates said non-braking portions to frictionally engage said braking portions with said braking surface in an increasing amount in response to increasingly effective centrifugal force in proportion to the increase of the rotational speed of said plate above said predetermined speed thereof.

13. The mechanical brake according to claim 11 in which said snap-action means disposes said levers on said common pivot substantially with a maximum angular distance between said levers for actuating said non-braking portions to lock said braking portions disengaged with said braking surface regardless of the centrifugal force effective below the predetermined plate speed, and said snap-action means breaks away said levers from said common pivot with a snap action to reduce the angular distance between said levers for actuating said non-braking portions to un-lock said braking portions and thereafter to frictionally engage said last-mentioned portions with said braking surface in response to the centrifugal force effective substantially at said predetermined plate speed.

14. The mechanical brake according to claim 13 in which said snap-action means further breaks said levers on said common pivot and thereby further reduces the angular distance between said levers for further actuating said non-braking portions to frictionally engage said braking portions with said braking surface in an increasing amount in response to increasingly effective centrifugal force in proportion to the increase of the rotational speed of said plate above said predetermined speed thereof.

References Cited in the file of this patent

UNITED STATES PATENTS

| | | |
|---|---|---|
| 2,392,950 | Russell | Jan. 15, 1946 |

FOREIGN PATENTS

| | | |
|---|---|---|
| 165,340 | Germany | Sept. 11, 1904 |
| 310,941 | Germany | June 6, 1918 |
| 541,804 | Germany | Dec. 14, 1931 |
| 543,164 | Germany | Jan. 14, 1932 |
| 350,468 | Great Britain | June 4, 1931 |